US007962752B2

(12) United States Patent
Brickell et al.

(10) Patent No.: US 7,962,752 B2
(45) Date of Patent: Jun. 14, 2011

(54) METHOD FOR PROVIDING TRUSTED TIME IN A COMPUTING PLATFORM

(75) Inventors: Ernest F. Brickell, Portland, OR (US); Clifford D. Hall, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 1052 days.

(21) Appl. No.: 11/233,543

(22) Filed: Sep. 23, 2005

(65) Prior Publication Data

US 2007/0074044 A1    Mar. 29, 2007

(51) Int. Cl.
G06F 15/177 (2006.01)
G06F 11/30 (2006.01)
G06F 1/26 (2006.01)
G08B 29/00 (2006.01)

(52) U.S. Cl. .............. 713/178; 713/193; 713/1; 726/34; 368/46

(58) Field of Classification Search .................... None
See application file for complete search history.

(56) References Cited

U.S. PATENT DOCUMENTS

| | | | | |
|---|---|---|---|---|
| 4,628,504 | A | * 12/1986 | Brown | 370/458 |
| 5,444,780 | A | * 8/1995 | Hartman, Jr. | 380/30 |
| 6,728,880 | B1 | 4/2004 | Sites | |
| 7,036,013 | B2 | * 4/2006 | Renganarayanan et al. | 713/178 |
| 7,146,504 | B2 | * 12/2006 | Parks et al. | 713/178 |
| 7,409,557 | B2 | * 8/2008 | Teppler | 713/178 |
| 2004/0128528 | A1 | 7/2004 | Poisner | |

FOREIGN PATENT DOCUMENTS

EP    0635790 A1    1/1995
WO    2007/038031 A3    4/2007

OTHER PUBLICATIONS

International Search Report for PCT/US2006/036151 mailed Apr. 10, 2007, 11 pages.
International Preliminary Report on Patentability for Patent Application No. PCT/US2006/036151, mailed Apr. 3, 2008, 8 pages.
TPM Main Part 1 Design Princiiples Specification Version 1.2, Revision 81, Nov. 23, 2004, TCG Published, 9 pages.

* cited by examiner

*Primary Examiner* — Matthew T Henning
(74) *Attorney, Agent, or Firm* — Steven Skabrat

(57) ABSTRACT

Providing trusted time in a computing platform, while still supporting privacy, may be accomplished by having a trusted time device provide the trusted time to an application executing on the computing platform. The trusted time device may be reset by determining if a value in a trusted time random number register has been set, and if not, waiting a period of time, generating a new random number, and storing the new random number in the trusted time random number register. The trusted time random number register is set to zero whenever electrical power is first applied to the trusted time device upon power up of the computing platform, and whenever a battery powering the trusted time device is removed and reconnected. By keeping the size of the trusted time random number register relatively small, and waiting the specified period of time, attacks on the computing platform to determine the trusted time may be minimized, while deterring the computing platform from being uniquely identified.

18 Claims, 4 Drawing Sheets

METHOD FOR PROVIDING TRUSTED TIME IN A COMPUTING PLATFORM

BACKGROUND

1. Field

The present invention relates generally to computer security and, more specifically, to providing time in a computing platform that is trusted by executing applications.

2. Description

Obtaining a value for time that can be trusted in a computing platform is desirable. For example, trusted time may be used in conjunction with other processing to improve the robustness of content protection mechanisms to assure that premium content is available for the digital home. It may be used in a content protection environment to assure that the computing platform owner downloads a revocation list of compromised keys on a periodic basis. It may also be used to provide a secure way to enable content to be purchased for access during a temporary time window. However, if the time value can be modified by an unscrupulous user without detection by the computing platform, then computer security and content protection systems may be compromised.

Existing solutions to providing trusted time require a battery contained in a tamper resistant hardware module that cannot be easily removed by the user (such as described in Trusted Platform Module (TPM) Main part 1 Design Principles, Specification Version 1.2, Revision 81, Nov. 23, 2004, pp. 93-98, available from the Trusted Computing Group). This may be problematic for continued operation of some computer systems as they age and the battery needs replacement. If the user can't change the battery without disrupting system operation, frustration with the system may ensue.

Therefore, a better mechanism to provide a trusted time value in a computing platform would be useful.

BRIEF DESCRIPTION OF THE DRAWINGS

The features and advantages of the present invention will become apparent from the following detailed description of the present invention in which.

DETAILED DESCRIPTION

An embodiment of the present invention is a method and apparatus for providing trusted time in a computing platform. One security requirement is that the user must not be able to modify the trusted time. In one embodiment, a battery may be used that provides electrical power to a small group of trusted time circuits. An initial connection to a trusted time source may be used to initialize the trusted time. The property is achieved that as long as the trusted time circuits are powered up, trusted time will be provided in the computing platform. If power to the trusted time circuits is ever removed, then the absence of power will be detected, thus requiring a connection to the trusted time source to reinitialize the trusted time mechanism.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
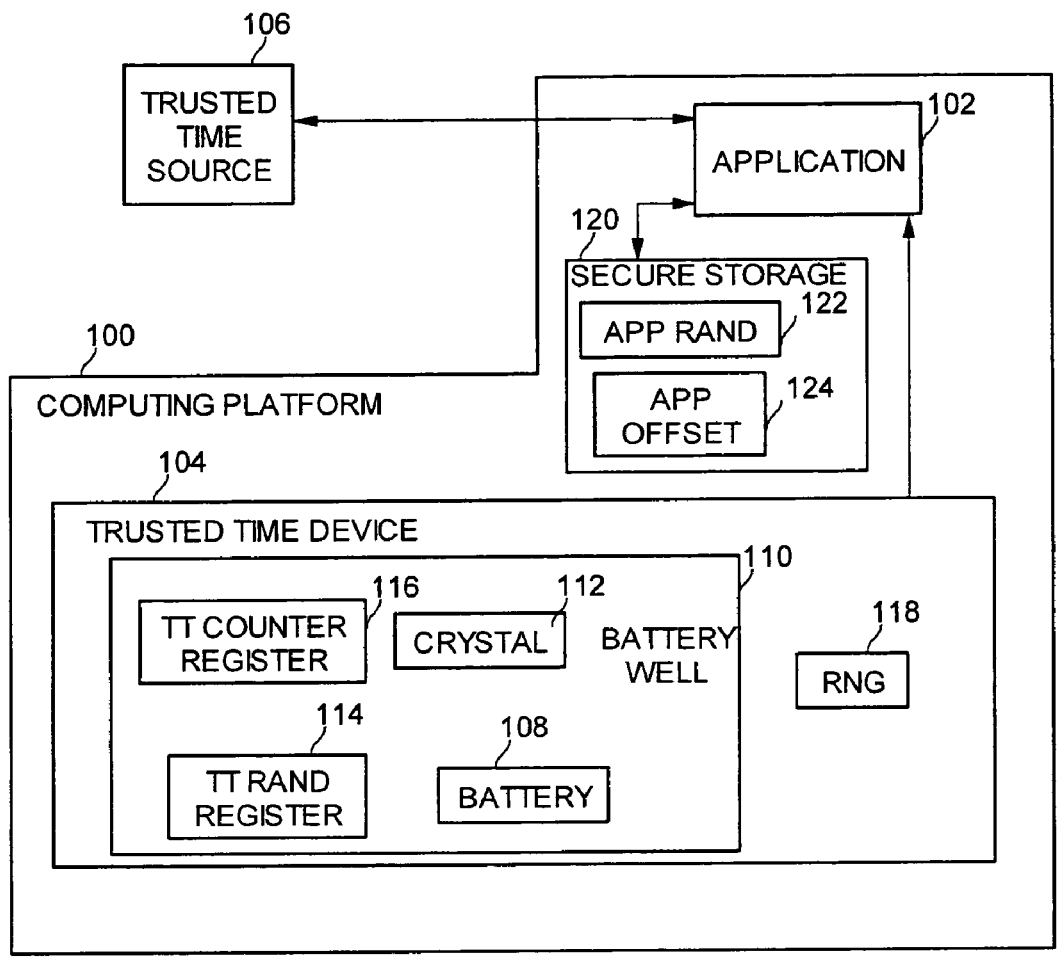
FIG. 1 is a diagram of a trusted time architecture according to an embodiment of the present invention.

FIG. 1 is a diagram of a trusted time architecture according to an embodiment of the present invention. A computing platform 100 includes an executing application program 102 and trusted time device 104. The computing platform may be any system having a processor for executing instructions, such as a personal computer, a server, a laptop or handheld computer, a personal digital assistant (PDA), a cell phone, a set-top box, and so on. Well known details of components of such a system have been omitted from FIG. 1 for clarity. Application 102 may be any computer program for providing some functionality to a user of the computing platform that uses trusted time for some processing. The application wants to use trusted time and has functionality to store information securely so that the information cannot be easily modified by the user without detection.

The application communicates with a trusted time source 106 for obtaining an initial trusted time. Trusted time source 106 comprises a source external to the computing platform that can provide a trusted time value. The trusted time source may be communicatively coupled with the application in any way (e.g., via a network such as the Internet, or an intranet).

In embodiments of the present invention, the application wants to trust the time available on the computing platform, even if the user is an adversary. Further, the mechanism for providing trusted time should be privacy-friendly. That is, the trusted time mechanism should not uniquely identify the computing platform, which might raise privacy concerns. In the present invention, trusted time device 104 provides trusted time unless power is removed. If power is removed, the application can detect this event.

Trusted time device 104 comprises a hardware computing device which contains trusted battery well 110 powered by trusted time battery 108, and other circuits (not shown) that are not powered by the trusted time battery. In one embodiment, the trusted time device may be integrated into the Input/Output (I/O) Controller Hub (ICH) of a computer system's chipset. Trusted time device 104 includes battery 108, which comprises a conventional replaceable power source to provide small amounts of electrical power for a very long time. In one embodiment, the battery is the same as the Real Time Clock battery existing in many computing platforms. Trusted time battery well 110 comprises a small set of circuits that are powered by battery 108, and remain powered up as long as the trusted time battery 108 is operational and not removed.

The trusted time battery well includes at least three other components. Crystal 112 comprises a circuit that produces a clock pulse at a constant and known frequency. In one embodiment, the crystal may be outside of the trusted time batter well. Trusted time (TT) Random (Rand) register 114 comprises a register to store a random number. TT Counter register 116 comprises a register that, in one embodiment, increments by one with a fixed frequency. The frequency may be once for each tick of crystal 112, or once per second. In one embodiment, the size of the TT Counter may be set such that the computing platform could operate for 20 years, for example, before rolling over the counter. For the TT Rand and TT Counter registers, when power is first provided to these registers, they are set to all zeros. If power is ever removed and then restored, the registers are set to all zeros.

Trusted time device 104 also includes a random number generator (RNG) 118. RNG comprises a circuit that provides a random number as needed.

Computing platform 100 also includes secure storage 120. Secure storage is a component used to store data in a secure manner that is not easily tampered with by the user or any other party. In one embodiment, secure storage 120 comprises a trusted platform module (TPM) as described by specifications available from the Trusted Computing Group. In another embodiment, secure storage may be provided using known tamper resistant software techniques. Application 102 has the ability to securely store at least two values: Application Random value (Rand) 122, and Application Offset 124.

Figure 2:
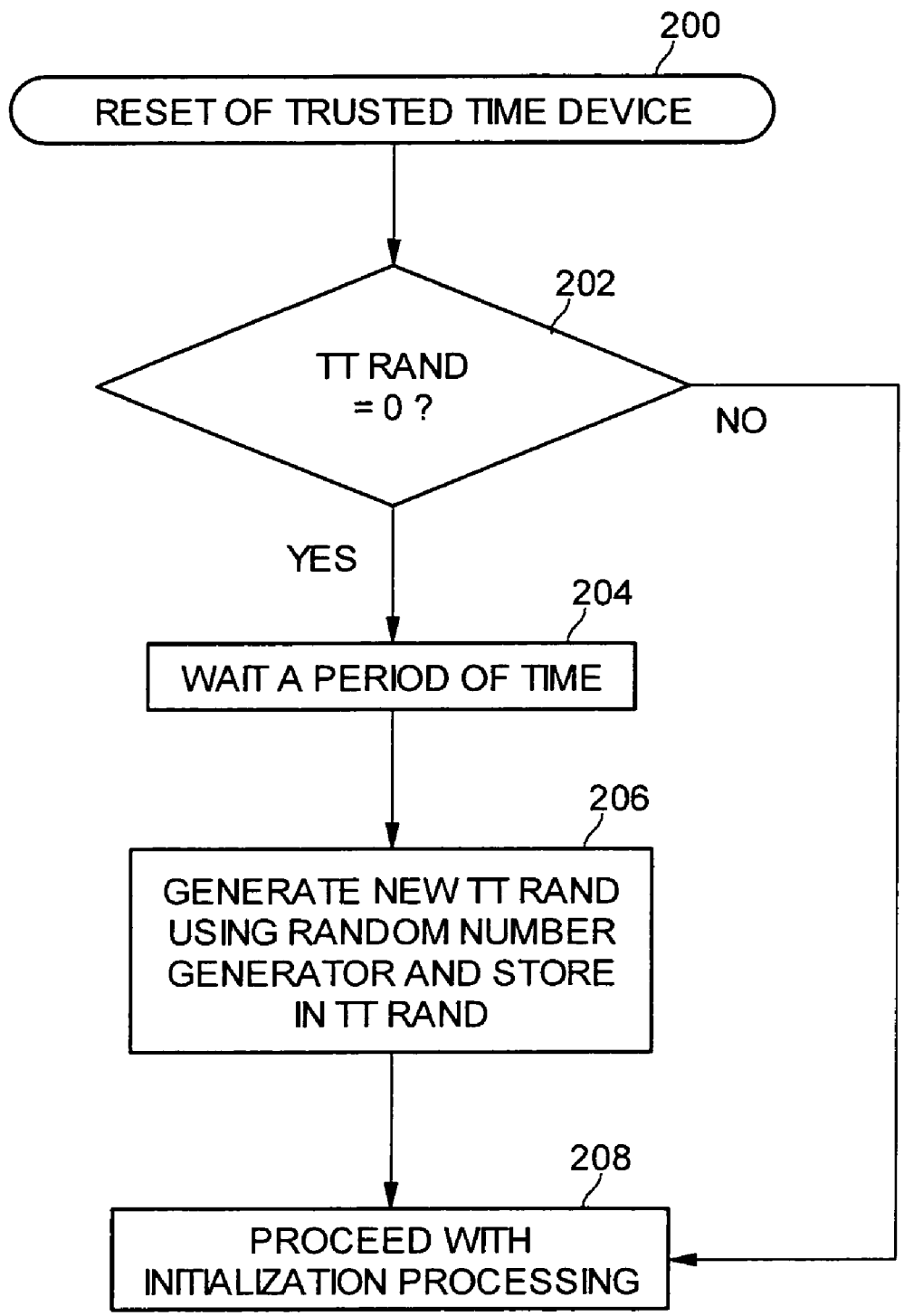
FIG. 2 is a flow diagram illustrating resetting a trusted time device according to an embodiment of the present invention.

FIG. 2 is a flow diagram illustrating resetting 200 a trusted time device according to an embodiment of the present invention. Resetting may be performed whenever power is applied to the computing platform (i.e., at power on of the system). At block 202, the computing platform checks TT Rand 114 to determine if the value currently stored in the TT Rand register is zero. If TT Rand is not zero, this means that the battery has continually powered the trusted time device since the last time the battery was replaced, and the computing platform may proceed with initialization processing at block 208. If TT Rand is zero, this means that battery 108 has been disconnected and reconnected. The computing platform then waits a period of time at block 204. In one embodiment, this period of time is a fixed amount of one minute. In other embodiments, the period of time may be a different fixed amount of time, such as 30 seconds, two minutes, three minutes, and so on. In still further embodiments, the period of time may be variable over successive resets. At block 206, a new TT Rand may be generated using random number generator (RNG) 108 and stored in TT Rand 114 before continuing with initialization processing at block 208.

Because the value of TT Rand is a random number, there is a potential concern that it could be used to identify the computing platform. In an embodiment of the present invention, this is solved by carefully picking the size of TT Rand, and by modifying the behavior of the population of TT Rand. First, the size of TT Rand may be chosen small enough such that it will not be a unique identifier of the computing platform. Second, the only time that TT Rand will be populated anew upon a system reset is after the power has been removed to the Trusted Time Battery Well 110 (i.e., the battery has been disconnected). The time delay prior to repopulating the TT Rand register will only occur when the battery has been disconnected, and not during typical resets of the computing platform. Thus, a substantial time delay between reset and the time that TT Rand is populated with a new random value during reset of the trusted time device may be used for the case when TT Rand is all zeros.

Taking these requirements into account, in one embodiment, the TT Rand register comprises a 16 bit register. If a one minute time delay is used at block 204, then it would take an expected number of $2^{16}$ trials (taking approximately 45 days) of continual attempts in a brute force attack before the value of TT Rand matches the value of App Rand 122 stored in secure storage 120. But since there are hundreds of millions of computing platforms in service worldwide, $2^{16}$ (65,536) is a small enough number so that it would not be construed as a unique identifier of the computing platform, thereby supporting user privacy. Other sizes for the TT Rand register (e.g., 20 bits) and the time delay may be used depending on system implementation requirements without departing from the present invention.

Figure 3:
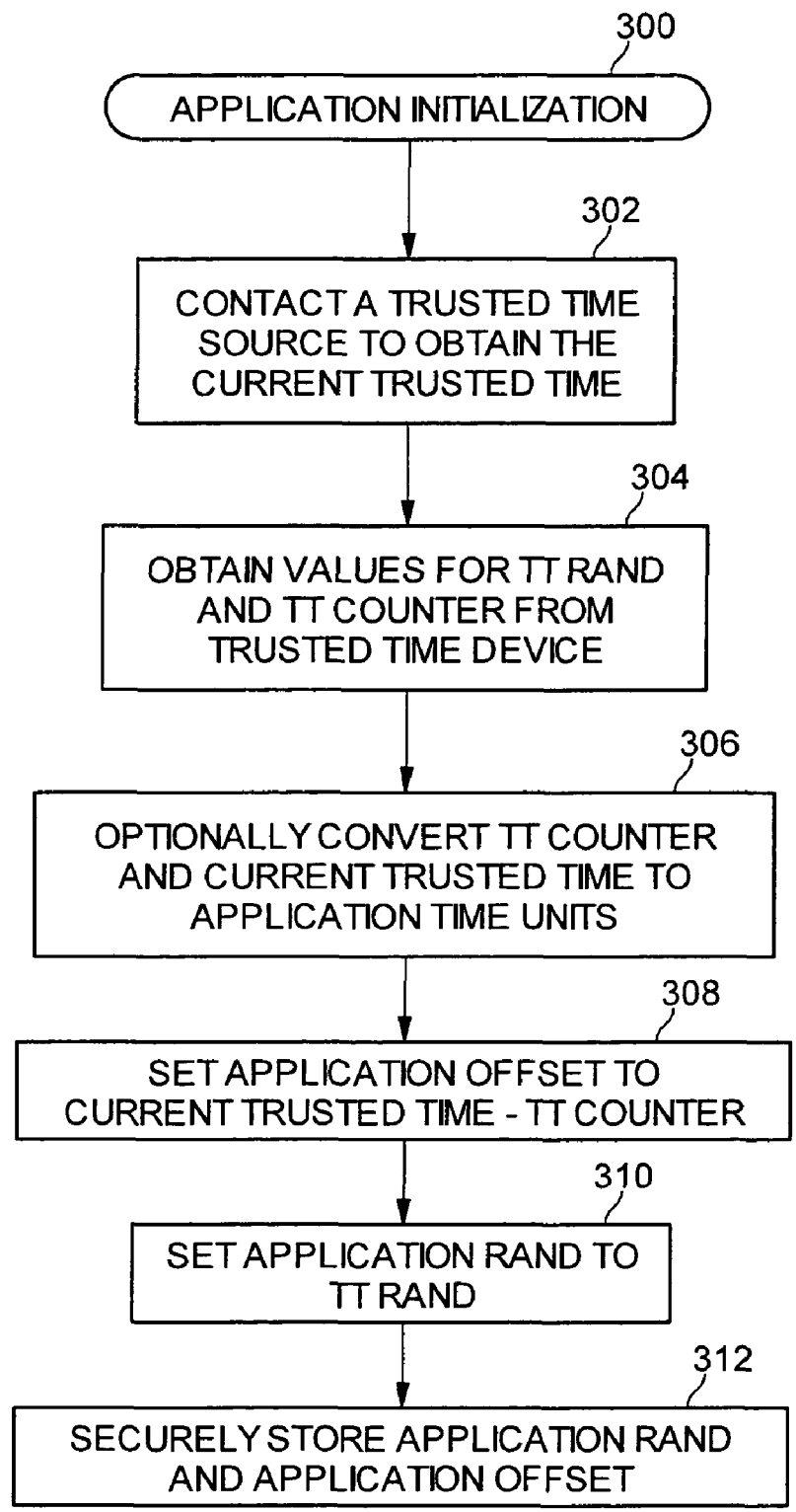
FIG. 3 is a flow diagram illustrating application initialization according to an embodiment of the present invention.

FIG. 3 is a flow diagram illustrating application initialization 300 according to an embodiment of the present invention. At block 302, the application contacts a trusted time source 106 to obtain the current trusted time. In one embodiment, this may be accomplished in a secure manner by the application sending a nonce to the trusted time source, the trusted time source digitally signing the current trusted time and the nonce with its private key, and the trusted time source sending the signed current trusted time and nonce to the application. If the application has the public key of the trusted time source, the application can decrypt the signed current trusted time and nonce, and check to make sure the received nonce matches the nonce sent to the trusted time source. At block 304, the application obtains values for TT Rand and TT Counter from the appropriate registers 114, 116 in the battery well of the trusted time device 104. Next, at block 306, the application optionally converts the TT Counter obtained from the trusted time device and current trusted time obtained from the trusted time source to application time units, if necessary. At block 308, the application sets the application offset to the current trusted time minus TT Counter. This acts as a baseline value for later measurement of elapsed time since initialization. At block 310, the application sets the application random value to TT Rand 114. At block 312, the application securely stores the modified application offset 124 and application random value 122 in secure storage 120.

Figure 4:
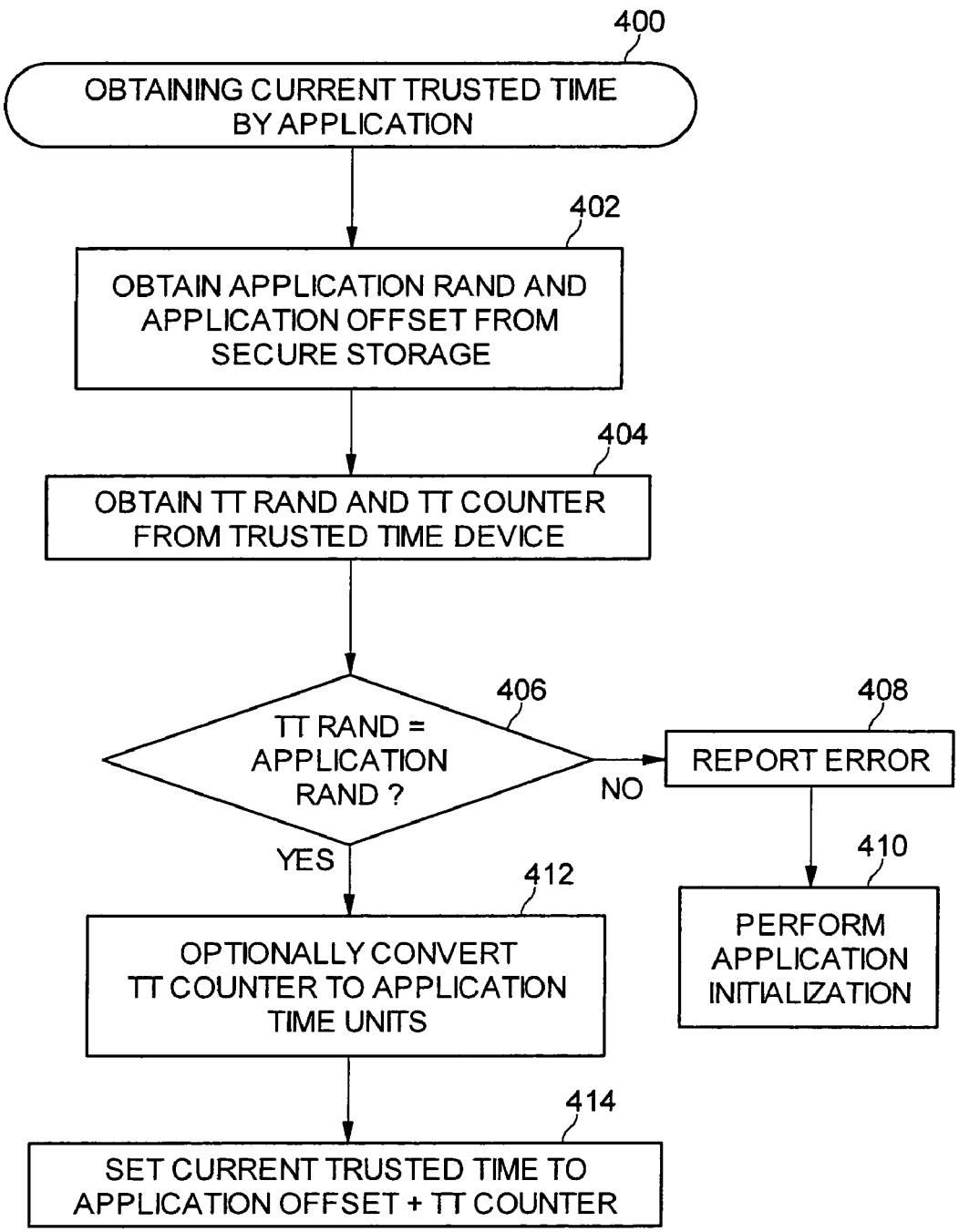
FIG. 4 is a flow diagram illustrating obtaining the current trusted time by an application according to an embodiment of the present invention.

FIG. 4 is a flow diagram illustrating obtaining the current trusted time by an application 400 according to an embodiment of the present invention. These actions may be performed when an executing application needs to locally access the current trusted time during application processing subsequent to initialization. At block 402, the application obtains application random value 122 and application offset 124 from secure storage 120. At block 404, the application obtains TT Rand 114 and TT Counter 116 from the battery well of the trusted time device 104. At block 406, if TT Rand does not match the application random value, then an error may be reported at block 408, and application initialization may be performed again as represented in FIG. 4 at block 410. If TT Rand does match the application random value, then the application optionally converts TT Counter to application time units (if necessary) at block 412, and sets the current trusted time to the application offset+TT Counter at block 414. The current trusted time may then be used by the application for further processing.

Although the operations detailed herein may be described as a sequential process, some of the operations may in fact be performed in parallel or concurrently. In addition, in some embodiments the order of the operations may be rearranged.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a non-transitory computer readable medium having stored thereon instructions that may be used to program a processing system or other electronic device to perform the methods. The term "non-transitory computer readable medium" used herein shall include any medium that is capable of storing or encoding a sequence of instructions for execution by a machine and that cause the machine to perform any one of the methods described herein. The term "non-transitory computer readable medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A method of supporting privacy for a computing platform having a trusted time device to provide trusted time to an application executing on the computing platform comprising:
    resetting the trusted time device by determining if a value in a register has been set to indicate power to the trusted time device has not been removed since a last power disruption to the trusted time device and that the trusted time device is to be initialized, and if not, waiting a period of time after determining that the value in the register has not been set, generating a new random number after waiting the period of time, and storing the new random number in the register; and
    initializing the computing platform after storing the new random number in the register by obtaining a current trusted time from a trusted time source, the trusted time source being external to the computing platform, obtaining the random number from the register and a counter value from a counter within the trusted time device, storing an application offset value equal to the current trusted time minus the counter value into a secure storage within the computing system, and storing the random number read from the register into the secure storage.

2. The method of claim 1, further comprising resetting the trusted time device whenever electrical power is applied at power up of the computing platform.

3. The method of claim 1, further comprising setting the register to zero whenever electrical power is first provided to the trusted time device, and whenever electrical power is removed and then restored to the trusted time device.

4. The method of claim 1, wherein at least a portion of the trusted time device is powered by a battery within the trusted time device.

5. The method of claim 1, wherein the period of time comprises a fixed amount of time.

6. The method of claim 1, wherein the period of time comprises a variable amount of time.

7. The method of claim 1, wherein the register comprises less than or equal to 20 bits.

8. The method of claim 1, further comprising obtaining the current trusted time for use by an application program executing on the computing platform at a point in time after computing platform initialization by obtaining the random number and the application offset value from the secure storage, obtaining the current contents of the register and the counter from within the trusted time device, comparing the random number from the secure storage to current contents of the register within the trusted time device, and when the random number from the secure storage matches the current contents, setting the current trusted time to the application offset plus the counter value from the trusted time device.

9. An article comprising: a non-transitory computer readable storage medium containing instructions, which when executed, result in supporting privacy for a computing platform having a trusted time device to provide trusted time to an application executing on the computing platform by resetting the trusted time device by determining if a value in a register has been set to indicate power to the trusted time device has not been removed since a last power disruption to the trusted time device and that the trusted time device is to be initialized, and if not, waiting a period of time after determining that the value in the register has not been set, generating a new random number after waiting the period of time, and storing the new random number in the register; and initializing the computing platform after storing the new random number in the register by obtaining a current trusted time from a trusted time source, the trusted time source being external to the computing platform, obtaining the random number from the register and a counter value from a counter within the trusted time device, storing an application offset value equal to the current trusted time minus the counter value into a secure storage within the computing system, and storing the random number read from the register into the secure storage.

10. The article of claim 9, further comprising instructions for resetting the trusted time device whenever electrical power is applied at power up of the computing platform.

11. The article of claim 10, wherein the period of time comprises a fixed amount of time.

12. A computing platform comprising:
    a trusted time device to provide trusted time to an application to be executed on the computing platform;
    a random number generator;
    a secure storage, and
    a register;
    wherein the trusted time device is capable of being reset by determining if a value in the register has been set to indicate power to the trusted time device has not been removed since a last power disruption to the trusted time device and that the trusted time device is to be initialized, and if not, waiting a period of time after determining that the value in the register has not been set, generating a new random number after waiting the period of time by the random number generator, and storing the new random number in the register; and wherein the computing platform is to be initialized after storing the new random number in the register by obtaining a current trusted time from a trusted time source, the trusted time source being external to the computing platform, obtaining the random number from the register and a counter value from a counter within the trusted time device, storing an application offset value equal to the current trusted time minus the counter value into the secure storage within the computing system, and storing the random number read from the register into the secure storage.

13. The trusted time device of claim 12, wherein the trusted time device is reset whenever electrical power is applied at power up of the computing platform.

14. The trusted time device of claim 12, wherein the trusted time device is capable of resetting the register to zero whenever electrical power is first provided to the trusted time device, and whenever electrical power is removed and then restored to the trusted time device.

15. The trusted time device of claim 12, further comprising a battery to power at least a portion of the trusted time device, wherein the battery is within the trusted time device, and wherein the trusted time device is incorporated into an input/output controller hub of the computing platform.

16. The trusted time device of claim 12, wherein the period of time comprises a fixed amount of time.

17. The trusted time device of claim 12, wherein the register comprises less than or equal to 20 bits.

18. The trusted time device of claim 12, wherein the trusted time device does not uniquely identify the computing platform.

* * * * *